June 19, 1951  A. C. ARBOGAST  2,557,403
METHOD AND APPARATUS FOR MAKING PIPE FITTINGS
Filed Dec. 30, 1946
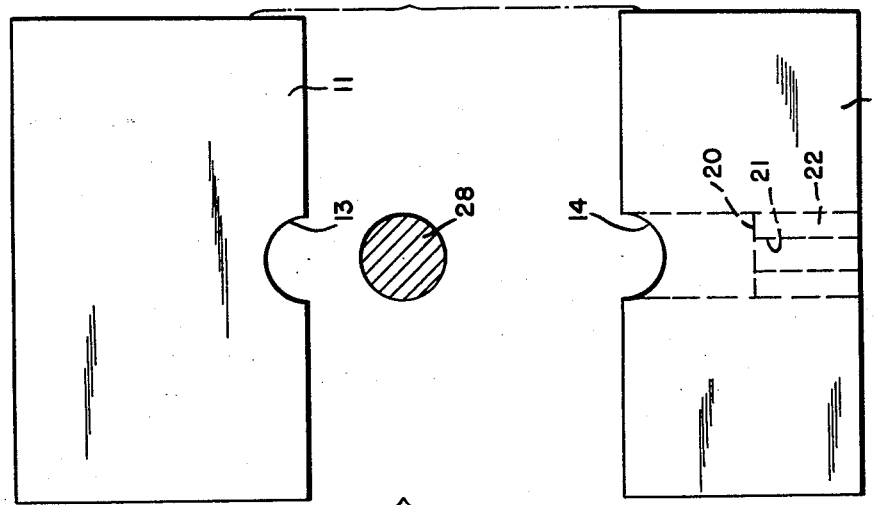
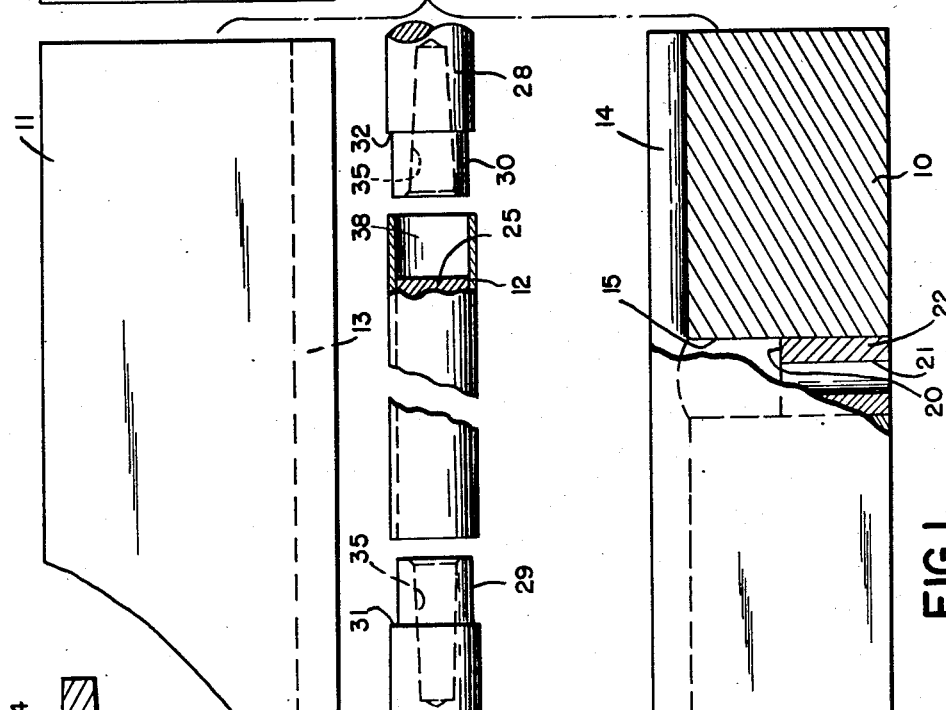
INVENTOR.
ALFRED C. ARBOGAST.
BY Whittemore, Hulbert
& Belknap
ATTORNEYS.

Patented June 19, 1951

2,557,403

UNITED STATES PATENT OFFICE 2,557,403

METHOD AND APPARATUS FOR MAKING PIPE FITTINGS

Alfred C. Arbogast, Elkhart, Ind., assignor to Northern Indiana Brass Company, Elkhart, Ind., a corporation of Indiana Application December 30, 1946, Serial No. 719,157

3 Claims. (Cl. 29—157)

The present invention relates to method and apparatus for making pipe fittings, and more particularly to a method and apparatus which operates to apply pressure interiorly of a tube to expand or extrude the same into a confined space which determines the size and shape of the extruded portion.

The present invention relates specifically to certain improvements in apparatus and method applicable to the practice of the invention set forth in Patent 2,111,695, entitled "Method of Making Pipe Fittings," granted March 22, 1938 to Seeber et al. In the prior patent there is disclosed a method of making pipe fittings which comprises supplying a plastic material to the interior of a pipe or tube and thereafter applying pressure to the ends of the tube and the plastic therein while confining the tube in a die having a confined space or branch communicating therewith. The pressure applied to the ends of the tube and to the plastic medium in the tube causes extrusion of a portion of the tube into the branch and causes the extruded portion of the tube to conform in cross sectional dimensions to the branch.

According to the teachings of the prior patent, the end of the extruded tubular portion was unconfined, and in accordance with well understood principles it assumed a hemispherical shape. The length of the extruded branch of the fitting depended upon the amount of plastic material within the tube, the amount of reduction of length of the original tube by the pressure applied to the ends thereof, and the operation of means intended to afford a relief flow of plastic filler material. Thus, for example, in the patent there was disclosed the provision of recesses located at the ends of plungers movable toward each other to apply pressure to the ends of the tubing and to the filler material. As an alternative it was suggested that the end of the extruded branch of pipe could be provided with a small hole prior to its insertion into the die so that the plastic filler material could be extruded therethrough.

In accordance with the present invention, more positively acting means to determine the length of the branch and to conform the end thereof to desired shape is provided. Furthermore, in addition to the foregoing, the means which determines the precise location and shape of the end of the extruded branch of the fitting is provided with means operable upon complete extrusion of the branch to the desired shape and dimension for effecting a relief flow of excess filler material by perforating the end of the extruded branch of the fitting. Finally, other means independent of the last mentioned means is provided for effecting a relief flow of excess filler material in such manner that as this relief flow of excess filler material continues, it encounters a progressively increasing resistance. Finally, contrary to the teachings of the prior patent identified above, lubricating means are provided to facilitate movement of the plastic filler material within the tube and also lubricant is employed at the exterior of the tubing to facilitate flow of the tubing material along the walls of the die.

With the foregoing general remarks in mind, it is an object of the present invention to provide an improved method and apparatus for cold working and extruding a tube into a branched fitting of predetermined dimensions by the application of pressure both to the ends of the tube and to a plastic filler material within the tube while confining the tube generally against expansion except at a point where a branch is to be formed thereon, and at said point providing a confined space for shaping the branch as formed to desired shape and dimensions.

More specifically, it is an object of the present invention to provide, in apparatus for cold working a tube into a branched fitting, a die having a space therein for the reception of an extruded branch, said space being of generally cylindrical shape and having a transverse bottom wall adapted to form a flat end surface on the extruded branch of the tubing.

It is a further object of the present invention to provide the transverse wall aforesaid with an opening preferably having sharp edges to serve as a punch for forming an opening in the bottom of the extruded branch to permit flow of excess filler material therethrough.

It is a further object of the present invention to provide apparatus of the character described having tapered recesses of inwardly reduced cross section provided in the end faces of plungers which apply pressure to the tubing and the filler material therein.

It is a further object of the present invention to provide in apparatus of the character described plungers having reduced end portions of a size adapted to fit closely within the ends of the tubing and having annular shoulders spaced from the ends of the plungers to engage the ends of the tubing so as to apply pressure thereto.

It is a further object of the present invention to provide in the method of forming tubing the step of providing lubricant between the plastic filler material and the interior wall of the tube.

It is a further object of the present invention to provide in the described method of cold working tubing the steps of providing for a relief flow of excess filler material and of providing lubricant between the plastic filler material employed and the interior wall of the tubing so as to facilitate such relief flow of filler material.

It is a further object of the present invention to provide a method and apparatus for forming branched fittings from tubing characterized by the reduction of waste material, both the material of the tubing and the material employed as a filler material.

It is a further object of the present invention to provide a method and apparatus for forming tubing characterized by the lack of sensitivity to the amount of filler material employed, which results from provision of means for taking care of excess filler material.

It is a further object of the present invention to provide method and apparatus for forming tubing characterized by provisions for taking care of excess filler material so that such excess may be provided deliberately to prevent defective operation due to voids, porosity or entrapped air within the body of the filler material.

It is a further object of the present invention to improve the method of forming tubing so as to provide for a greatly increased depth of draw without danger of rupture or serious thinning of the wall.

Other objects and features of the invention will become apparent as the description proceeds, especially when taken in conjunction with the accompanying drawings, wherein:

Figure 1 is an exploded view partly in section showing the upper and lower die members, a length of tubing to be worked and the plunger elements for cooperation therewith;

Figure 2 is an exploded end view of the structure shown in Figure 1; and

Figure 3 is a sectional view through the completed fitting showing the displacement of filler material due to relief flow thereof.

Referring now to Figure 1, the die comprises a lower member 10 and an upper member 11 movable apart as indicated to provide for the reception of a charged tube 12 therein. The upper die member 11 is provided with a semi-cylindrical transverse opening 13 therein, and the lower die member 10 is provided with an upwardly facing semi-cylindrical opening 14 therein, the two being adapted to register so as to form a completely cylindrical enclosure adapted to closely embrace the tube 12 when the die is closed. As illustrated, the lower die member 10 is provided with a branch opening 15 of cylindrical cross section and which in the present embodiment is illustrated as of the same cross section as the cylindrical chamber formed by the semi-cylindrical openings 13 and 14. It will be appreciated, however, that the branch 15 may if desired be of different size and of different shape.

In forming the fitting which in the present embodiment is illustrated as a T fitting, the final product will of course have certain predetermined dimensions for the various branches, and accordingly the branch which is extruded and formed into the branch opening 15 should be of a definitely predetermined length. Accordingly, at a position within the opening 15 corresponding to the desired length there is placed a transverse wall 20 having an opening 21 extending therethrough. As illustrated, the transverse wall 20 is formed by a hollow cylindrical member 22 which is firmly supported in desired position in the branch opening 15.

In order to apply pressure simultaneously to the ends of the tube 12 and to the plastic filler material 25 which is supplied therein, there are provided two plungers 27 and 28 which may be of identical construction. Plungers 27 and 28 have reduced end portions 29 and 30, respectively, of a size to fit snugly within the ends of the tube 12. A short distance from the ends of the plungers 27 and 28 are annular shoulders or projections 31 and 32 which are adapted to engage the ends of the tube 12 at the same time as the reduced ends 29 and 30 of the plungers engage the ends of the filler material 25 therein.

Each of the plungers 27 and 28 is provided with a tapered recess 35 of inwardly reduced cross section and of a volumetric capacity more than sufficient to accommodate any relief flow of filler material 25 which will be encountered in use. The exact area of the end openings of the recesses 35 and the exact taper which is supplied thereto will of course vary with the particular fitting being formed and it is impossible to set up general rules to cover all cases. However, the cross section and taper of the recesses 35 bear a relationship to the cross sectional area of the opening 21, since the recesses 35 and the opening 21 all cooperate to afford relief flow of excess filler material.

As a specific example where the tube 12 has an outside diameter of 1.773", very satisfactory results were obtained when the diameter of the tapered recesses 35 at their large ends was .781" and taper was provided of .025" per inch. In this case the diameter of the opening 21 formed in the transverse wall or partition 20 was .660". These specific dimensions are merely given as an illustrative example and as a guidance for future design. It is not to be understood that the ratios between these dimensions must always be preserved. It is found in practice that a certain amount of experimentation is necessary to arrive at the specific dimensions best suited for a particular problem. However, while the exact dimensions for best results are not deducible by formula, beneficial results are obtained from the provision of the openings and recesses as above outlined irrespective of specific dimensions.

In the operation of the apparatus the tube 12 is provided with plastic filler material which may be of the type disclosed in the Seeber patent identified above. This material preferably is cast into the tubing 12 in such a manner as to leave end openings in the tube as indicated at 38 approximately of a size to receive the reduced end portions 29 and 30 of the plungers 27 and 28. Preferably a lubricant is provided in the interior of the tube 12 so as to lie between the interior wall of the tube 12 and the plastic material 25.

In this connection it is noted that a wide variety of lubricants may be employed, but for reasons of convenience it is preferred to employ non-liquid lubricants. Among suitable lubricants may be mentioned graphite, or other non-liquid material. In determining the proper lubricant, it is only necessary to select one which answers the requirements that it must function effectively under pressure and temperature conditions encountered and must lend itself to application to the interior of the tube so as to remain in position to afford lubrication after the melted plastic material has been cast into the tubing.

In addition to the provision of lubricant at the interior of the tubing to lubricate the passage of the plastic material over the interior face of the tubing, it is also preferred to provide lubricant at the exterior of the tubing so as to facilitate the flow of material of the tubing over the walls of the die during the forming process.

In the practice of the invention as outlined in the prior Seeber patent, it was necessary to provide filler material in a substantially exactly predetermined amount so as to afford an extrusion of the branch to the desired length. Less than the required amount of filler material would result in a short branch being formed, and if an excess of filler material were present the branch would be longer than necessary, or more probably rupture of the metal would occur. It was previously thought essential to exercise considerable care to avoid the inclusion of air or voids in the plastic filler material but the practice of the invention as outlined herein renders this unnecessary.

In accordance with the present invention, an excess of the filler material 25 is deliberately supplied at the interior of the tubing 12. When the ends of the plungers 27 and 28 contact the ends of the filler material and when the annular shoulders 31 and 32 contact the ends of the tube, initial movement of the plungers 27 and 28 toward each other, tending to compress the material of the tubing and to apply pressure to the filler material, causes a flow of excess filler material into the recesses 35. By proper selection of the diameter of the large end of the recesses 35 and of the taper of the recesses, the pressure which is effective to cause displacement of the metal of the tube 12 into the branch 15 is predetermined. As the plungers continue to move toward each other, excess filler material will continue to be forced into the recesses 35 but the pressure necessary to cause this continued relief flow of filler material increases due to the increasing resistance encountered as a result of the tapered configuration of these recesses.

When the extruded branch of the fitting has reached the desired length so that the end thereof encounters the wall 20, additional pressure first causes the end of the extruded branch to become substantially flat. Further movement of the plungers 27 and 28 toward each other after the branch has been extruded to its desired final shape and dimensions results in the severance of a small disk of metal 40 (Figure 3) from the bottom of the extruded branch in what may be termed a punching operation. For this purpose it is preferred that the corners of the opening 21 shall be sharp. After severance of the disk 40 from the bottom of the branch 41, there is a relief flow of excess filler material through the opening 21. At this time the fitting has been completely formed and it is accordingly desirable that this relief flow of filler material take place with a minimum of resistance to flow. Accordingly, if desired the opening 21 may be given a slight relief or outward taper.

The completed product is illustrated in Figure 3, in which the original tube 12 has been substantially shortened and at least a substantial portion of the metal made available by the shortening of the tube 12 has gone into the formation of the branch 41. It will further be noted that the branch 41 is formed to a substantially exact dimension and has a flat bottom 42. In order to complete the branch the plastic filler material 25 is melted out of the fitting and the end of the branch 41 may then be sawed off close to the flat bottom 42. It will of course be obvious that the formation of the end of the branch 41 into a flat transverse wall represents a substantial saving of material over prior practice, which resulted in the formation of a hemispherical end on the extruded branch.

It is further to be observed that the provision of the reduced shoulders 29 and 30 on the plungers results in end portions 43 and 44 of the completed fitting which are of predetermined wall thickness. Inwardly from the ends 43 and 44 the tube 12 in its portion opposite to the branch 41 will be somewhat thickened as a result of the flow of metal under pressure.

The provision of the tapered recesses 35 permits the extrusion of the branch 41 to be carried to a greater length than otherwise possible, and in addition tends to maintain a substantially uniform wall thickness in the extruded branch. The tapered recesses permit maintenance of the speed of extrusion in direct proportion to the flow of metal in the fitting. Otherwise, if the speed of the plastic filler material is excessive, the wall structure of the extruded portion 41 will be stretched and thinned. On the other hand, if the speed of the filler material is slower than the flow of the metal of the tubing, there is an excessive thickening of the tubing wall.

The provision of the tapered recess 35 has an additional important function in that it permits the provision of the plastic filler material in the tube 12 to be made without particular care, since it is only necessary that an excess amount of material be provided sufficient to take care of any voids or air spaces which might happen to be present. As previously described, the initial movement of the plungers compresses the filler material and eliminates the porosity, voids or air spaces therein before any substantial extrusion takes place. In other words, the initial pressure densifies the filler material prior to any substantial extrusion.

Due to the relief flow of plastic filler material both into the recesses 35 and through the opening 21 in the wall 20 of the die, there necessarily results a flow of filler material relative to the inner wall surface of the tube 12. In the case of the relief flow of filler material into the recesses 35, this flow is in fact counter to the direction of flow of the metal of the wall tubing. Accordingly, the provision of the lubricant to facilitate movement of the filler material over the inner wall of the tube 12 becomes particularly advantageous. It will be appreciated that due to the extreme pressures applied there is a tendency for the filler material to adhere to the inner surface of the tube 12 and to pick up the inside surface, thus tending to produce too thin a wall structure, or in extreme cases to rupture the wall of the fitting. It is found that the use of the lubricant as described results in a saving of original material necessary to form a desired fitting, for the reason that the lubrication permits flow of the filler material as the change in volume takes place, thereby reducing the resistance between the surfaces of the wall of the tube and the filler material upon flow of metal into the branch, thus avoiding the tendency to thicken the original tube walls between their ends at points opposite to the branch.

It has been found that when the present invention is practiced, substantially an entire length of the tube 12 may be extruded into the branch 41 without rupture. While in practical operation no such extreme extrusion is contemplated, it merely emphasizes the fact that for normal operations the practice of the present invention insures uniformly superior results.

In the drawing the tube 12 is illustrated as of circular cross section and the opening formed by the recesses 13 and 14 in the dies is also illustrated as of circular cross section. It will be appreciated that the present invention is by no means limited to the treatment and production of fittings in which the several branches are of circular cross section. In the claims the term "cylindrical" has been employed, and this term is to be taken in its broad generic sense as defining a shape generated by the motion of a straight line in a closed path while the line is maintained in parallelism with itself. Thus the original tube 12 and/or the branch 41 may be of oval, flattened, substantially rectangular or equivalent shape. As a matter of fact, it will be appreciated that the present invention lends itself to the production of fittings in which the branches are not cylindrical even in the broad sense as defined above. Instead, the finished product may have branches which are slightly tapered or which have other desired conformations and such variations are within the scope of the present invention.

It is to be understood that the present invention is an improvement on the Seeber patent identified above and reference is made to that patent for a full and complete exposition of matters not covered herein. More specifically, reference is made to the Seeber patent for a disclosure of the filler material to be employed and the material of fittings to which the present invention is applicable.

The plastic filler material which is employed operates in an entirely different manner from a hydraulic fluid inasmuch as it offers a substantial resistance to plastic flow. Accordingly, the provision of the tapered recesses in the ends of the plungers provides a convenient means for controlling the pressure available within the tubing to effect extrusion thereof. The plastic material will commence to flow into the recesses upon attainment of a predetermined pressure. As additional pressure is applied to the plastic material, more and more of the material flows into the recesses, the amount of material which is thus displaced being dependent upon and therefore to a considerable degree controlling the pressure within the plastic material. It is for this reason that it is essential that the recesses have a volumetric capacity, greater than sufficient to contain the required plastic flow which takes place prior to completion of the extruded branch. If the tapered recesses became filled with plastic material during the extrusion process their pressure controlling function would no longer be available.

While there have been illustrated and described certain specific embodiments of improved dies, plungers and method steps, it will be appreciated that this specific disclosure has been given merely to enable those skilled in the art to practice the invention, the scope of which is indicated by the appended claims.

What I claim as my invention is:

1. Apparatus for forming pipe fittings by cold working a metal tube having a plastic filler initially provided therein which comprises a die having a cylindrical space therein of a size to fit closely around the tube, and having a second space communicating with and extending laterally from said cylindrical space intermediate the ends thereof, opposed plungers movable longitudinally in said cylindrical space, said plungers having reduced end portions adapted to fit closely within the ends of the tube and annular shoulders spaced from the ends of said plungers shaped to engage the ends of the tube, means forming a transverse wall in said second space adapted to serve as a gauging abutment for the portion of the tube extruded into said second space, said wall having an opening therein to effect controlled rupture of the extruded portion of the tube, said plungers having inwardly converging recesses in their confronting ends to afford a relief flow of filler material at variable pressure, the volume of said recesses being more than sufficient to contain all relief flow of filler material prior to final shaping of the extruded branch.

2. Apparatus for forming pipe fittings by cold working a metal tube having a plastic filler initially provided therein which comprises a die having a cylindrical space therein of a size to fit closely around the tube, and having a second space communicating with and extending laterally from said cylindrical space intermediate the ends thereof, opposed plungers movable longitudinally in said cylindrical space, said plungers having reduced end portions adapted to fit closely within the ends of the tube and annular shoulders spaced from the ends of said plungers shaped to engage the ends of the tube, means forming a transverse wall in said second space adapted to serve as a gauging abutment for the portion of the tube extruded into said second space, said wall having an opening therein, the opening in said wall having sharp, relieved edges to punch a hole in the end of the extruded portion of the tube to afford relief flow of filler material, said plungers having inwardly converging recesses in their confronting ends to afford a relief flow of filler material at variable pressure, the volume of said recesses being more than sufficient to contain all relief flow of filler material prior to final shaping of the extruded branch.

3. The method of forming pipe fittings in the form of a T which comprises placing a predetermined quantity of a plastic filler material in a metal tube; confining the tube in a cylindrical die having open ends and a laterally extending cylindrical branch terminating in a transverse flat wall having an opening therethrough provided with cutting peripheral corners on the side thereof facing the cylindrical die; simultaneously moving plungers into opposite ends of said die into engagement with the ends of said tube; said plungers having reduced portions to fit within the ends of said tube, shoulders to bear against the ends of said tube, and inwardly tapering recesses in the ends thereof having a volumetric capacity more than sufficient to contain all relief flow of filler material prior to final shaping of the extruded branch; applying pressure to said plungers to shorten said tube and to force a wall portion of said tube into said cylindrical branch; providing a counterflow of plastic material into said recesses at increasing pressure determined by the taper and cross-sectional area of said recesses to limit the pressure within said plastic material operating on the end of the branch being formed; and increasing the pressure within said plastic material when the end of the branch being formed encounters said wall to first flatten the end of said branch, and then to relieve the increased pressure in said plastic material by cutting a hole in the end of said branch and causing plastic material to flow out of said hole.

ALFRED C. ARBOGAST.

REFERENCES CITED

The following references are of record in the file of this patent:

UNITED STATES PATENTS

| Number | Name | Date |
|---|---|---|
| 2,027,285 | Parker | Jan. 7, 1936 |
| 2,111,695 | Seeber | Mar. 22, 1938 |
| 2,133,445 | Guerin | Oct. 18, 1938 |
| 2,168,641 | Arbogast | Aug. 8, 1939 |
| 2,203,868 | Gray | June 11, 1940 |
| 2,206,741 | Cornell | July 2, 1940 |
| 2,340,566 | Ryder | Feb. 1, 1944 |